United States Patent
Yeo

(10) Patent No.: US 7,730,532 B1
(45) Date of Patent: Jun. 1, 2010

(54) AUTOMATIC TRACKING COOKIE DETECTION

(75) Inventor: Matthew Yeo, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1185 days.

(21) Appl. No.: 11/151,569

(22) Filed: Jun. 13, 2005

(51) Int. Cl.
*G08B 23/00* (2006.01)
(52) U.S. Cl. .................................................... 726/22
(58) Field of Classification Search .................. 726/22, 726/23, 24, 13, 25; 707/1; 717/126, 124, 717/131; 709/229
See application file for complete search history.

(56) References Cited

U.S. PATENT DOCUMENTS

| | | | |
|---|---|---|---|
| 6,088,803 A | 7/2000 | Tso et al. | |
| 6,314,409 B2 | 11/2001 | Schneck | |
| 6,611,814 B1 * | 8/2003 | Lee et al. | 705/26 |
| 6,928,553 B2 * | 8/2005 | Xiong et al. | 726/8 |
| 6,944,765 B1 * | 9/2005 | Rose et al. | 713/181 |
| 6,959,420 B1 * | 10/2005 | Mitchell et al. | 715/745 |
| 7,237,024 B2 * | 6/2007 | Toomey | 709/224 |
| 7,404,209 B2 * | 7/2008 | Shipp | 726/22 |
| 7,418,729 B2 * | 8/2008 | Szor | 726/22 |
| 7,461,262 B1 * | 12/2008 | O'Toole, Jr. | 713/182 |
| 7,506,047 B2 * | 3/2009 | Wiles, Jr. | 709/224 |
| 2002/0083343 A1 | 6/2002 | Crosbie | |
| 2002/0087882 A1 | 7/2002 | Schneier et al. | |
| 2002/0099818 A1 * | 7/2002 | Russell et al. | 709/224 |
| 2002/0157020 A1 * | 10/2002 | Royer | 713/201 |
| 2003/0014331 A1 * | 1/2003 | Simons | 705/27 |
| 2003/0037251 A1 * | 2/2003 | Frieder et al. | 713/200 |
| 2003/0051026 A1 | 3/2003 | Carter | |
| 2004/0098229 A1 * | 5/2004 | Error et al. | 702/186 |
| 2005/0131757 A1 * | 6/2005 | Chan et al. | 705/14 |
| 2005/0160002 A1 * | 7/2005 | Roetter et al. | 705/14 |
| 2005/0268112 A1 * | 12/2005 | Wang et al. | 713/188 |
| 2005/0273442 A1 * | 12/2005 | Bennett et al. | 705/67 |

FOREIGN PATENT DOCUMENTS

WO    WO 01/71499 A1    9/2001

OTHER PUBLICATIONS

Walter S. Mossberg g "Free microsoft program to battle spyware has some serious flaws" Jan. 14, 2005 p. A.5 pp. 1-2.*
"Electronic Commerce News" Apr. 26, 2004, vol. 9, Iss. 9 pp. 1-3.*

(Continued)

*Primary Examiner*—Eleni A Shiferaw
(74) *Attorney, Agent, or Firm*—Fenwick & West LLP

(57) ABSTRACT

A tracking cookie detection manager accurately detects tracking cookies. The tracking cookie detection manager identifies a third party cookie, and generates at least two requests that result in separately downloading the third party cookie. The tracking cookie detection manager examines the separately downloaded third party cookies, and determining whether they each include a unique user identifier. If the separately downloaded third party cookies do each include a unique user identifier, the tracking cookie detection manager determines that the third party cookie comprises a tracking cookie. On the other hand, if the third party cookies do not each include a unique user identifier, the tracking cookie detection manager determines that the third party cookie is not a tracking cookie.

16 Claims, 2 Drawing Sheets

OTHER PUBLICATIONS

Zone Labs Launches new security scanner service; free service helps internet users identify tracking cookies that pose threats to privacy and PC security. Business wire. New York: Apr. 13, 2004 pp. 1-3.*

Lee, Sin Yeung; Low, Wai Lup and Wong, Pei Yuen, "Learning Fingerprints for a Database Intrusion Detection System", Computer Security Laboratory, DSO National Labortories, Singapore, ESORICS Nov. 2002, LNCS 2502, pp. 264-279.

Low, Wai Lup, et al., "DIDAFIT: Detecting Intrusions In Databases Through Fingerprinting Transactions," ICEIS 2002, Fourth International Conference On Enterprise Information Systems, vol. 1, Apr. 3-6, 2002, pp. 121-128, Ciudad Real, Spain.

Change log for Analysis Console for Intrusion Detection (Acid), indicating release date of Sep. 8, 2000 [online]. Andrew.cmu.edu [retrieved Apr. 18, 2003]. Retrieved from the Internet: <URL: http://www.andrew.cmu.edu/~rdanyliw/snort/CHANGELOG>, U.S.A.

AirCERT web page, last updated Sep. 18, 2000 [online]. Cert.org [retrieved Apr. 18, 2003]. Retrieved from the Internet: <URL: http://www.cert.org/kb/aircertl>, U.S.A.

Analysis Console For Intrusion Detection (ACID) web page [online]. Andrew.cmu.edu [retrieved Apr. 18, 2003]. Retrieved from the Internet: <URL: http://www.andrew.cmu.edu/~rdanyliw/snort/snortacid.html>, U.S.A.

Schneier, Bruce, Managed Security Monitoring: Network Security for the 21st Century, 2001 [online]. Counterpane.com [retrieved Apr. 18, 2003]. Retrieved from the Internet: <URL: http://www.counterpane.com/msm.pdf>, U.S.A.

Web page, announcing Nov. 11, 2000 release of Dshield [online]. Deja.com [retrieved Apr. 18, 2003]. Retrieved from the Internet: >URL: http://groups.google.com/groups?selm=8vm48v%245pd%241%40nnrp1.deja.com&oe=UTF-8&output=gplain>, U.S.A.

e=Security, Inc., Correlation Technology for Security Event Management, Oct. 7, 2002 [online]. eSecurityins.com [retrieved Apr. 18, 2003]. Retrieved from the Internet: <URL: http://www.esecurityinc.com/downloads/Correlation_WP.pdf>, Vienna, VA.

MyNetWatchman.com web pages indicating Sep. 2000 beta release [online]. MyNetWatchman.com [retrieved Apr. 18, 2003]. Retrieved from the Internet: <URL: http://www.mynetwatchman.com/mynetwatchman/relnotes.htm>, Alpharetta, GA.

2000 Review of eSecurity product on Network Security web page [online]. SCMagazine.com [retrieved Apr. 18, 2003]. Retrieved from the Internet: <URL: http://www.scmagazine.com/scmagazine/2000_12/testc/network.htm#Open>.

"Caltarian Security Technology Platform", Riptech web pages [online]. Symantec.com [retrieved Apr. 18, 2003]. Retrieved from the Internet: <URL: http://enterprisesecurity.symantec.com/Content/displayPDF.cfm?SSSPDFID=35&EID=O>, U.S.A.

Slashdot.org web pages describing Dshield, dated Nov. 27, 2000 [online]. Slashdot.org [retrieved Apr. 18, 2003]. Retrieved from the Internet: <URL: http://slashdot.org/article.pl?sid=00/11/27/1957238&mode=thread>, U.S.A.

Chung, C., Gertz, M., and Levitt, K., "DEMIDS: A Misuse Detection System for Database Systems," Department of Computer Science, University of California at Davis, Oct. 1, 1999, pp. 1-18.

* cited by examiner

AUTOMATIC TRACKING COOKIE DETECTION

TECHNICAL FIELD

This invention pertains generally to computer user privacy, and more specifically to automatically detecting tracking cookies.

BACKGROUND

Cookies are small pieces of information that a web site stores on a user's computer. A cookie can be viewed and modified only by web pages on the same domain as the page that originally placed the cookie on the user's computer. Once a cookie has been placed on a user's computer, a web browser running on that computer will send that cookie along with every Hypertext Transfer Protocol (HTTP) request to the site from which the cookie originated.

Cookies have many legitimate, useful purposes, such as storing user preferences or automatically filling in form information that was entered in a previous session. However, cookies can also be used for non-legitimate reasons. One use of cookies that many people consider to be an invasion of privacy is the tracking of user behavior on the web for the purpose of targeting users with specific advertisements. This is accomplished as follows:

A user visits a legitimate web site, for example www.i-like-cars.com. This site includes an image that is downloaded from another site, for example www.ads.com. This image may be something obvious, like an advertising banner, or it may be something that the user will not even notice, such as a 1 by 1 pixel, white Joint Photographic Experts Group (JPEG) image. When www.ads.com returns the image to be displayed on www.i-like-cars.com, it also returns a cookie that contains a unique identifier for this user. Whenever the user visits a site that contains an image to be downloaded from www.ads.com, ads.com will receive the cookie uniquely identifying the user. If www.ads.com distributes its banner ads such that the HTTP request for each banner contains the Uniform Resource Locator (URL) of the page from which the request came, ads.com will know which page the user is visiting when the user receives an advertisement.

The user later visits a different site, say www.i-like-sports.com, that contains an advertising banner from www.ads.com. The cookie that identifies the user is delivered to ads.com when the banner ad is requested. Ads.com determines from the content of the cookie that the user previously viewed www.i-like-cars.com, and in response returns a car-related ad. Over time, ads.com will learn what sort of web pages this user visits, and will return ads that are targeted specifically to the user's interests.

The cookie returned from ads.com in this example is known as a third party cookie, because it belongs to a domain different than that of the primary web page currently being viewed (in this example, www.i-like-cars.com and later www.i-like-sports.com). Tracking cookies must, by definition, be third-party cookies. Since a cookie will only be sent to sites within the domain that originally issued it, first party cookies can only be used to track a user's behavior within a single domain.

One straightforward approach to protecting a user from tracking cookies is to maintain a list of known tracking cookies. An application could then periodically scan the user's computer and delete all cookies that are on the blacklist. However, maintaining a list of every tracking cookie on the internet is difficult, and would be very labor intensive if no automation were used.

One way to automatically build a list of tracking cookies is to use a web crawler to continually search the web. Since all tracking cookies are third-party cookies, the web crawler could simply traverse the web and store every third-party cookie that it identifies. Since there are few legitimate uses of third-party cookies, one might think that a large percentage of the third-party cookies received would be tracking cookies. However, in reality this is not the case. Several legitimate sites return cookies with every HTTP response, even in response to requests from third party sites. For example, site A might want to include in its page an image that is hosted on site B. If site B is configured to issue a cookie containing default user preferences along with every HTTP response, this cookie will look like a tracking cookie when it is received with the image that is embedded at site A. If many sites embed content from site B, this cookie might look like an especially prevalent tracking cookie to a web crawler.

What is needed are computer implemented methods, computer readable media and computer systems for accurately detecting tracking cookies, without generating a large number of false positives.

DISCLOSURE OF INVENTION

Computer-implemented methods, computer systems and computer-readable media accurately detect tracking cookies. A tracking cookie detection manager identifies a third party cookie, and generates at least two requests that result in separately downloading the third party cookie. The tracking cookie detection manager examines the separately downloaded third party cookies, and determines whether they each include a unique user identifier. If the separately downloaded third party cookies do each include a unique user identifier, the tracking cookie detection manager determines that the third party cookie comprises a tracking cookie. On the other hand, if the third party cookies do not each include a unique user identifier, the tracking cookie detection manager determines that the third party cookie is not a tracking cookie.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
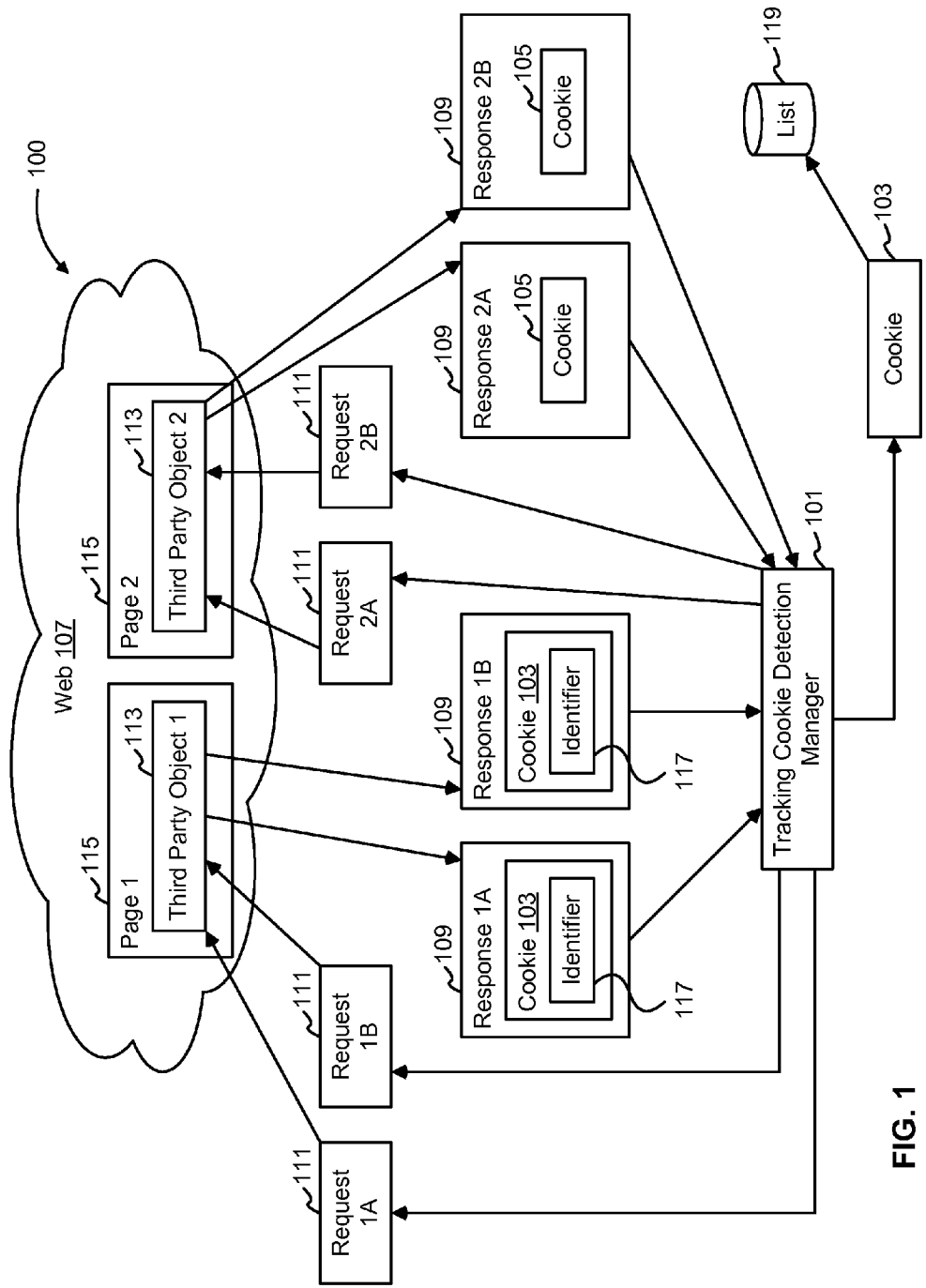
FIG. 1 is a block diagram, illustrating a high level overview of a system for detecting tracking cookies, according to some embodiments of the present invention.

FIG. 1 illustrates a high level overview of a system 100 for practicing some embodiments of the present invention. A tracking cookie detection manager 101 detects tracking cookies 103, without generating a large number of false positives. It is to be understood that although the tracking cookie detection manager 101 is illustrated as a single entity, as the term is used herein a tracking cookie detection manager 101 refers to a collection of functionalities which can be implemented as software, hardware, firmware or any combination of these. Where a tracking cookie detection manager 101 is implemented as software, it can be implemented as a standalone program, but can also be implemented in other ways, for example as part of a larger program, as a plurality of separate programs, as one or more device drivers or as one or more statically or dynamically linked libraries.

It is to be further understood that a tracking cookie detection manager 101 can be implemented as or as a component of a web crawler, spyware detection program, software security suite, web browser, plug-in and/or any application that attempts to detect tracking cookies 103. Furthermore, the tracking cookie detection manager 101 can be instantiated on and/or as part of a server, client, firewall, intrusion detection system, proxy, gateway, switch and/or any combination of these and/or other computing devices and/or platforms.

As illustrated in FIG. 1, the tracking cookie detection manager 101 identifies third party cookies 105, and determines whether identified third party cookies 105 comprise tracking cookies 103. The tracking cookie detection manager 101 can, for example, crawl the web 107 in order to locate cookies 105 that are transmitted in a response 109 to a request 111 for a third-party object 113 (e.g., an embedded image) within a primary web page 115. When the tracking cookie detection manager 101 locates a third party cookie 105, it generates multiple requests 111 (e.g., two separate requests) that each separately result in the downloading of the third party cookie 105.

For example, where the tracking cookie detection manager 101 receives a cookie 105 in a response 109 to a request 111 for a third-party object 113, the tracking cookie detection manager 101 sends a second HTTP request 111 for the same object 113. This second request 111 will appear to the third party object 113 to be a request 111 from a different user, and the cookie 105 will be sent again, with the intent of providing it to the different user.

The tracking cookie detection manager 101 examines the two values of the cookie 105 returned responsive to the two requests 111, in order to determine whether the separately downloaded third party cookies 105 each include a user identifier 117. If the cookie 105 is returned both times with the same value, it cannot be used to uniquely identify users, and thus cannot be a tracking cookie 103. On the other hand, if the requests 111 result in different values for the cookie 105, each value 105 probably comprises a unique identifier 117 for the perceived separate visitors of the site 113, and is likely a tracking cookie 103.

Thus, the tracking cookie detection manager 101 can determine whether the third party cookie 105 is a tracking cookie 103 based on whether the third party cookie 105 includes a separate user identifier 117 each time it is downloaded. Sites 113 that use cookies 105 to track user behavior use the value 117 of the tracking cookie 103 to uniquely identify each visitor to the site 113. When a user visits the site 113 for the first time, the site 113 will generate a unique value 117 identifying the user, and send that value 117 to the user in the form of the tracking cookie 103. For subsequent visits to the site 113, the tracking cookie 103 comprising the value 117 identifying the user will be sent to the site 113 with each HTTP request 111 made thereto.

Thus, if the value 117 of the cookie 105 is different for each new request 111 to the site 113, it is likely that the cookie 105 is used to uniquely identify each user. Therefore, according to some embodiments of the present invention, in this situation the tracking cookie detection manager 101 determines that the cookie 105 is in fact a tracking cookie 103.

On the other hand, if every request 111 results in the same value for the cookie 105, that cookie 105 cannot be used for tracking purposes, and more likely comprises something legitimate, such as default preferences. If the site 113 issues cookies 105 of the same value to different users, the cookies 105 cannot be used to track those users. Without the cookies 105 uniquely identifying the various users, the site 113 cannot differentiate between them. Therefore, in some embodiments of the present invention, under these circumstances the tracking cookie detection manager 101 determines that the cookie 105 is not a tracking cookie 103.

In some embodiments of the present invention, the tracking cookie detection manager 101 makes two requests 111 to the third party object 113 as described above, and subsequently examines two separately downloaded third party cookies 105. In other embodiments, the tracking cookie detection manager 101 makes more than two requests 111, and consequently examines more than two separately downloaded versions of the cookie 105, in order to have an even higher level of certainty as to whether the cookie 103 is or is not a tracking cookie 103. The specific number of requests 111 to generate is a variable design parameter which can adjusted up or down as desired.

In some embodiments of the present invention, once the tracking cookie detection manager 101 has identified a tracking cookie 103, the tracking cookie detection manager 101 adds the tracking cookie 103 to a list 119 of known tracking cookies 103. This list 119 can be used, for example, by an anti-spyware product on a client to delete tracking cookies 103.

Figure 2:
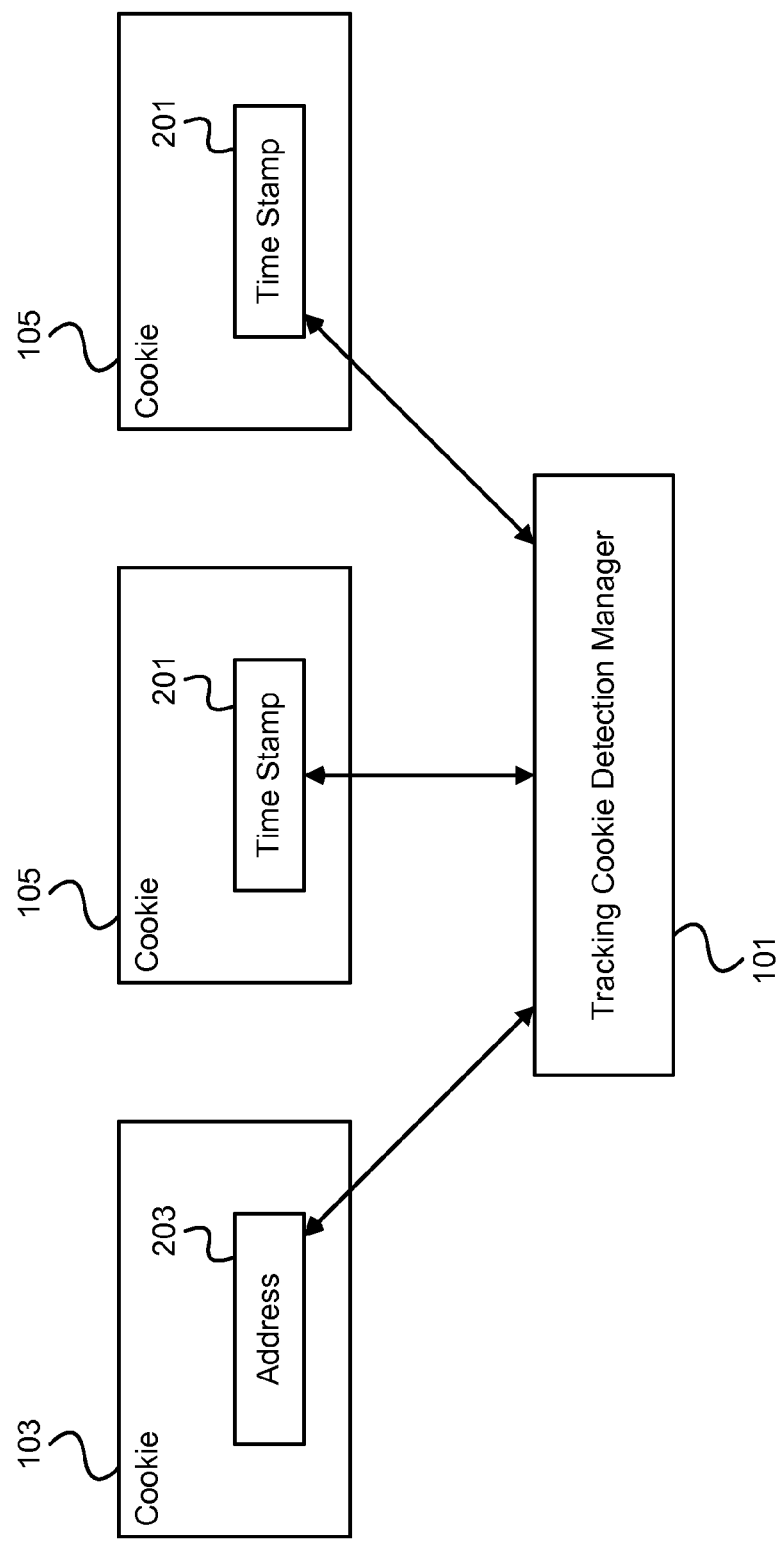
FIG. 2 is a block diagram, illustrating identifying tracking cookies according to other embodiments of the present invention.

As illustrated in FIG. 2, in some embodiments of the present invention, the tracking cookie detection manager 101 checks the separately downloaded third party cookies 105 for time stamps 201, and ignores time stamps 201 within the cookies 105 when determining whether the third party cookies 105 include unique user identifiers 117. It is to be understood that a third party cookie 105 can contain, as all or as a part of its value, a time stamp 201 indicating the time at which the user last visited the site 113. It is assumed that a cookie 105 is not necessarily a tracking cookie 103 merely because it records this information. However, since it cannot be guaranteed that the two requests 111 for the third-party object 113 will be stamped with the exact same time 201, comparing the cookie values without ignoring the time stamp 201 could result in falsely identifying third party cookies 105 as tracking cookies 103.

Observation shows that a large number of cookies 105 encode the time stamp simply as the number of seconds since Jan. 1, 1970. Thus, locating the time stamp 201 in a cookie 105 can comprise simply searching for a string of digits that is within some window of the current time. As the current number of seconds since 1970 is over one billion, the chances of a string that is not meant to be a time stamp 201 being falsely detected as one are small. Of course, in other embodiments the tracking cookie detection manager 101 identifies time stamps 201 in other ways, based on the storage formats thereof.

In some embodiments of the present invention, the tracking cookie detection manager 101 determines whether third party cookies 105 contain the network address 203 of the requesting user's computer (e.g., the IP address) as part of its value. If so, the tracking cookie detection manager 101 flags the cookie 105 as a tracking cookie 103. Since the network address 203 is unique to each user, it's presence in the value 117 means that the cookie 103 is unique for each user, and thus is likely being used to track users.

In some embodiments, in order to determine that a third party cookie 105 is in fact of the tracking variety 103, the tracking cookie detection manager 101 further determines that the cookie is available from a plurality of domains (e.g., two, three, four, etc.). This provides a greater level of certainty of the status of the third party cookie 105 as being a tracking cookie 103. Since a tracking cookie 103, by definition, tracks a user's behavior across multiple domains, a tracking cookie 103 typically appears on a large number of different domains. The specific number of domains to use is a variable design parameter.

As will be readily apparent to one of ordinary skill in the relevant art in light of this specification, utilizing the present invention as disclosed herein will typically dramatically reduce the false positive rate of any method of automatically detecting tracking cookies.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method comprising steps of:
   using a computer processor configured to execute the method steps for detecting tracking cookies, the steps comprising:
   receiving a first third-party cookie in response to a first request for a third-party object within a primary web page;
   receiving a second third-party cookie in response to a second request for the third-party object, wherein the first request and the second request are transmitted from a single entity, the first request and the second request configured to appear to a server hosting the third party object as requests from different entities;
   examining the first third-party cookie and the second third-party cookie;
   determining whether the first third-party cookie and the second third-party cookie each include a user identifier;
   responsive to determining that the first third-party cookie and the second third-party cookie each include at least one user identifier, comparing the user identifiers to determine if they are different from each other; and
   responsive to the user identifiers being different, determining that the first and the second third-party cookies are tracking cookies.

2. The method of claim 1 wherein the user identifiers in the first third-party cookie and the second third-party cookie are user addresses.

3. The method of claim 1 wherein determining that the first and the second third-party cookies are tracking cookies further comprises:
   determining that the first or the second third-party cookie is associated with a third party object embedded within a plurality of primary domains.

4. The method of claim 1 further comprising:
   responsive to determining that the first and the second third-party cookies do not each include at least one user identifier, determining that the first or the second third-party cookie is not a tracking cookie.

5. The method of claim 1 further comprising:
   responsive to determining that the first and the second third-party cookies are tracking cookies, adding the first or the second third-party cookie to a list of known tracking cookies.

6. A computer-readable storage medium storing an executable computer program product for detecting tracking cookies, the computer program product comprising:
   program code for receiving a first third-party cookie in response to a first request for a third party object within a primary web page;
   program code for receiving a second third-party cookie in response to a second request for the third party object, wherein the first request and the second request are transmitted from a single entity, the first request and the second request configured to appear to a server hosting the third party object as requests from different entities;
   program code for examining the first third-party cookie and the second third-party cookie;
   program code for determining whether the first third-party cookie and the second third-party cookie each include a user identifier;
   program code for comparing the user identifiers to determine if they are different from each other responsive to determining that the first third-party cookie and the second third-party cookie each include at least one user identifier; and
   program code for determining that the first and the second third-party cookies are tracking cookies responsive to the user identifiers being different.

7. The computer-readable storage medium of claim 6 further comprising:
   program code for identifying a time stamp within each of the first and the second third-party cookies; and
   program code for ignoring the time stamp when determining whether the first and the second third-party cookies each include at least one user identifier.

8. The computer-readable storage medium of claim 6 wherein the user identifiers in the first third-party cookie and the second third-party cookie are user addresses.

9. The computer-readable storage medium of claim 6 wherein the program code for determining that the first and the second third-party cookies are tracking cookies further comprises:
   program code for determining that the first or the second third-party cookie is associated with a third party object embedded within a plurality of primary domains.

10. The computer-readable storage medium of claim 6 further comprising:
   program code for determining that the first or the second third-party cookie is not a tracking cookie, responsive to determining that the first and the second third-party cookies do not each include at least one user identifier.

11. The computer-readable storage medium of claim 6 further comprising:
   program code for adding the first or the second third-party cookie to a list of known tracking cookies, responsive to determining that the first and the second third-party cookies are tracking cookies.

12. A computer system for accurately detecting tracking cookies, the computer system comprising:
   a computer-readable storage medium storing executable software portions comprising:
      a software portion configured to receive a first third-party cookie in response to a first request for a third-party object within a primary web page;
      a software portion configured to receive a second third-party cookie in response to a second request for the third-party object, wherein the first request and the second request are transmitted from a single entity, the first request and the second request configured to appear to a server hosting the third party object as requests from different entities;
      a software portion configured to examine the first third-party cookie and the second third-party cookie;
      a software portion configured to determine whether the first third-party cookie and the second third-party cookie each include a user identifier;
      a software portion configured to compare the user identifiers to determine if they are different from each other responsive to determining that the first third-party cookie and the second third-party cookie each include at least one user identifier;
      a software portion configured to determine that the first and the second third-party cookies are tracking cookies responsive to the user identifiers being different; and
   a processor configured to execute the software portions stored by the computer-readable storage medium.

13. The computer system of claim 12 further comprising:
   a software portion configured to identify a time stamp within each of the first and the second third-party cookies; and
   a software portion configured to ignore the time stamp when determining whether the first and the second third-party cookies each include at least one user identifier.

14. The computer system of claim 12 wherein the user identifiers in the first third-party cookie and the second third-party cookie are user addresses.

15. The computer system of claim 12 further comprising:
   a software portion configured to determine that the first or the second third-party cookie is not a tracking cookie, responsive to determining that the first and the second third-party cookies do not each include at least one user identifier.

16. A computer system for accurately detecting tracking cookies, the computer system comprising:
   a computer-readable storage medium storing executable software means comprising:
      reception means for receiving a first third-party cookie in response to a first request for a third-party object within a primary web page, and receiving a second third-party cookie in response to a second request for the third-party object, wherein the first request and the second request are transmitted from a single entity, the first request and the second request configured to appear to a server hosting the third party object as requests from different entities;
      examination means for examining the first third-party cookie and the second third-party cookie;
      determination means for determining whether the first third-party cookie and the second third-party cookie each include a user identifier, and for determining whether or not the first third-party cookie or the second third-party cookie is a tracking cookie;
      comparison means for comparing the user identifiers to determine if they are different from each other responsive to determining that the first third-party cookie and the second third-party cookie each include at least one user identifier;
      second determination means for determining that the first and the second third-party cookies are tracking cookies responsive to the user identifiers being different; and
   a processor configured to execute the software means stored by the computer-readable storage medium.

* * * * *